Patented Jan. 14, 1941

2,228,717

UNITED STATES PATENT OFFICE 2,228,717

METHOD OF STEEPING CORN

Carl Bergquist, Stockholm, Sweden, assignor to Corn Products Refining Company, New York, N. Y., a corporation of New Jersey No Drawing. Application August 19, 1938, Serial No. 225,719

13 Claims. (Cl. 127—68)

This invention relates to the production of starch from corn (maize); and the primary object of the invention is to make certain improvements in the process whereby the starch will have a greater viscosity, that is higher "Scott test" when it is cooked to a paste than starch produced by the processes now commonly used.

In the production of starch from corn by the usual wet process, the corn is first steeped in water containing sulphur dioxide, is then coarse ground, the germ removed and the residue finely ground and subjected to separating operations for removing the starch and gluten from the hull and fiber (slop) whereupon the gluten is separated from the starch by tabling or other expedient and the starch washed in washing filters and dried.

This process brings about a thinning of the starch, when pasted, so that the finished starch may have a Scott test of between 80 and 90, as against a theoretical Scott of 150. Heat, agitation, and particularly the presence of acidic material tend to bring about the thinning of the starch when in a wet state as it is in this process. That is, the starch is modified or slightly converted or hydrolyzed while the corn material is being treated in the wet starch system for recovery of the starch.

A large part of this modification takes place in the steeping of the corn and is due in part to the production of lactic acid, by action of bacteria on the carbohydrates, and the production of amino acids resulting from the action of bacteria on corn protein substances. The modification is due also, to some extent, to enzymic action on the starch.

In accordance with the present invention the steeping of the corn with sulphur dioxide is retained as that agent appears to be necessary in order to prevent bacterial putrefaction and to obtain a proper softening of the corn kernel so that the germ may be removed and the starch separated from germ, hull and fiber; but in accordance with the present invention conditions are created in the steeping operation which tend to destroy or at least inhibit the action of lactic acid and amino acid bacteria and, which preferably, control and limit modification by enzymic action. As a result of these expedients the starch produced will cook up to a much thicker paste than the starch produced by present day commercial methods. For example, the Scott test may be raised to about 150.

The invention contemplates the use of several expedients, some or all of which may be employed.

In order to destroy or inhibit the action of the lactic acid and amino acid bacteria a germicide is used in the steeping operation. Such germicide must be water insoluble. It must be a liquid so that it can form an emulsion with the steep water and thus be able to penetrate the kernel and reach the germ and gluten which contain most of the bacteria. It must not be detrimentally affected in its action by sulphur dioxide or the other agents used in the steeping operation. It must be readily volatilized so that it can be completely removed from the process by the drying of the starch in the starch kilns or equivalent operation. It must not interfere with the softening action of the corn kernel which is one of the primary purposes of the steeping operation.

Experience has shown that the most effective and useful germicides, meeting all of the above requirements, are the halogenated aromatic hydrocarbons, mono-chlor-benzene ($C_6H_5Cl$), which has a boiling point of 270° F., and ortho-chlor-toluene ($ClC_6H_4CH_3$) which has a boiling point of 318° F. Preferably both of these agents are used on the principle that all germicides are more or less selective in action so that a combination of two is better than the use of one or the other alone.

When, as is customary, steep water is made by passing water through a sulphur tower filled with the fumes of burned sulphur, the hydrogen ion concentration of the steep water will be about pH 4.2. At this pH the steeping water has a thinning action on the starch; and it has been found that if the pH of the steep water can be raised to the pH of the starch, which on the average is about 6.5, possible variation in range being pH 5.6–6.9, the thinning of the starch will be considerably decreased, that is the Scott test index raised. To effect this sulphur dioxide is used in the form of an alkaline bisulphite in place of sulphur dioxide alone. These bisulphites act as buffers to keep the pH of the solution up.

Ammonium bisulphite also acts to retard enzymic activity. Neither sodium bisulphite, nor either of the two germicides above mentioned, is effective as against the type of enzymic activity which brings about thinning. The use of ammonium bisulphite alone would give too high a pH. Hence it is preferable to use both bisulphites in the proportion of two-thirds sodium bisulphite and one-third ammonium bisulphite, by weight dry substance basis.

The amount of the germicides together is preferably between 0.05% and 0.1% by weight on the dry substance corn.

The usual practice of countercurrent steeping may be employed in which the corn is steeped in a series of steeping vessels, the steeping water being used first in the steep containing the oldest corn and, after passing through the other steeps in succession, being discharged from steep containing the fresh corn. Any usual steeping temperature from 120° to 135° F. may be employed. The sulphur dioxide concentration of the steep water entering the system may be within the customary ranges of 0.1% and 0.2%. The amount of $SO_2$ in the steep liquor is not a vital factor because even with a high $SO_2$ content the Scott test of the starch will be high provided the pH in the steeps is high. A preferred pH is between 6.3 and 6.5.

The Scott test for thick boiling starches, referred to above, is as follows: 15 grams of 12% moisture starch to be tested is mixed with 280 cc. of distilled water at room temperature. The beaker containing the mixture is put into a boiling water bath and stirred constantly for five minutes by means of a mechanical agitator rotating at 200 revolutions per minute. At the end of five minutes the beaker is covered with a watch glass and the contents allowed to boil for another period of five minutes. At the end of ten minutes the watch glass is removed, the condensate is drained back and the material stirred, at the above rate the draining and stirring taking ten seconds. The watch glass is put back on the beaker and the mixture allowed to boil for one minute and fifty seconds or until twelve minutes time has elapsed. The watch glass is removed, the condensate is drained back into the beaker and contents stirred, these operations taking fifteen seconds. At the end of twelve minutes and fifteen seconds, elapsed time, the contents of the beaker is transferred to a Scott cup, described below, and at the end of fifteen minutes, total elapsed time, the plunger valve of the cup is withdrawn, allowing the paste to pass into a graduated cylinder arranged below the cup. The Scott index for any given paste is the number of seconds required for the delivery of 50 cc. of the starch paste from the cup. The Scott cup is a cup or funnel having a discharge tube in the bottom about 3.175 mm. long with an orifice about 1.588 mm. in diameter which is closed by a plunger valve. The orifice is adjusted as to diameter on the basis of a master cup. The average commercially made, non-modified corn starch, when tested as above, has a Scott between 85 and 90.

The following is a specific application of the invention to practice. It is understood that this example is merely typical and informative. The invention is not to be regarded as limited to the specific data there given. The intention, in fact, is to cover all equivalents and all modifications of the described process within the scope of the appended claims.

*Example.*—For 400 parts by weight of corn is used 600 parts of water to which is added 0.33 part of mono-chlor-benzene and 0.11 part of ortho-chlor-toluene. To the water is added a mixture of two-thirds sodium bisulphite powder and one-third ammonium bisulphite, by weight, in sufficient amount to give the water a content of 0.12% sulphur dioxide. The fresh steep water will have a hydrogen ion concentration of pH 6.5. The steeping is carried out in five steeps for nine hours in each steep. The steep water from the first steep is transferred to the second, third, fourth and fifth consecutively. The fresh steep water goes on the oldest corn and the oldest steep water on the fresh corn so that the corn in each steep vessel receives five steeping treatments. The temperature is maintained substantially uniform in all of the steeps.

The corn is then processed in the usual manner. The germicides will be removed by volatilization from the steep water in the normal operation of concentrating steep water; and any residual quantities of the germicides in the starch, gluten and slop will be volatilized when these materials are dried.

I claim:

1. In the production of starch from corn the improvement in the process of steeping the corn which comprises: introducing into the steep water a halogenated aromatic hydrocarbon of the group consisting of mono-chlor-benzene and ortho-chlor-toluene to inhibit bacterial activity tending to produce lactic and amino acids.

2. In the production of starch from corn the improvement in the process of steeping the corn which comprises: introducing into the steep water mono-chlor-benzene and ortho-chlor-toluene to inhibit bacterial activity tending to produce lactic and amino acids.

3. In the production of starch from corn the improvement in the process of steeping the corn which comprises: introducing into the steep water mono-chlor-benzene and ortho-chlor-toluene in an amount equal to 0.05%–0.1% on the weight of the dry substance corn.

4. In the production of starch from corn the improvement in the process of steeping the corn which comprises: using a steep water containing sulphur dioxide obtained by dissolving an alkaline bisulphite to give the steep water a pH of 5.6–6.9.

5. In the production of starch from corn the improvement in the process of steeping the corn which comprises: using steep water containing sulphur dioxide obtained by dissolving ammonium and sodium bisulphites to give the steep water a pH of 5.6–6.9.

6. In the production of starch from corn the improvement in the process of steeping the corn which comprises: using a steep water containing ammonium bisulphite and sodium bisulphite in substantially the proportion of one-third ammonium bisulphite and two-thirds sodium bisulphite to give the steep water a pH of 5.6–6.9.

7. In the production of starch from corn the improvement in the process of steeping the corn which comprises: using a steep water containing ammonium bisulphite and sodium bisulphite and having a pH of 5.6–6.9.

8. In the production of starch from corn the improvement in the process of steeping the corn which comprises: using a steep water containing alkaline bisulphite and having substantially the pH of the corn treated.

9. In the production of starch from corn the improvement in the process of steeping the corn which comprises: using a steep water containing ammonium bisulphite and having a pH of 5.6–6.9 to check enzymic acid tending to thin the starch.

10. In the production of starch from corn the improvement in the process of steeping the corn with water which comprises: using steep water containing as germicides mono-chlor-benzene and ortho-chlor-toluene, and sulphur dioxide obtained by dissolving sodium and ammonium bisulphites to give the steep water a pH of 5.6–6.9.

11. In the production of starch from corn the improvement in the process of steeping the corn with water which comprises: using steep water containing as a germicide mono-chlor-benzene and ortho-chlor-toluene, and containing also sulphur dioxide obtained by dissolving sodium and ammonium bisulphites whereby said steep water has a pH of 5.6–6.9.

12. In the production of starch from corn the improvement in the process of steeping the corn with water which comprises: using steep water containing a halogenated aromatic hydrocarbon of the group consisting of mono-chlor-benzene and ortho-chlor-toluene, and also containing sulphur dioxide obtained by dissolving an alkaline bisulphite to give the steep water a pH of 5.6–6.9.

13. Process of steeping corn for the production of starch having high paste viscosity which comprises: steeping the corn at a temperature of about 120°–135° F. with water containing mono-chlor-benzene and ortho-chlor-toluene 0.05% to 0.1% based on the weight of dry substance corn; and containing also a mixture of two-thirds by weight sodium bisulphite and one-third ammonium bisulphite in an amount to give the steep water a sulphur dioxide content of about 0.12% and a hydrogen ion concentration of about 6.5 pH.

CARL BERGQUIST.